United States Patent
Vasseur et al.

(10) Patent No.: US 8,184,971 B2
(45) Date of Patent: May 22, 2012

(54) OPTIMIZATION MECHANISM FOR USE WITH AN OPTICAL CONTROL PLANE IN A DWDM NETWORK

(75) Inventors: Jean Philippe Vasseur, Dunstable, MA (US); Ornan Gerstal, Los Altos, CA (US); Gabriele Maria Galimberti, Masciago (IT); Giovanni Martinelli, Lombardia (IT)

(73) Assignee: Cisco Technology, Inc., San Jose, CA (US)

( * ) Notice: Subject to any disclaimer, the term of this patent is extended or adjusted under 35 U.S.C. 154(b) by 1076 days.

(21) Appl. No.: 11/959,630

(22) Filed: Dec. 19, 2007

(65) Prior Publication Data

US 2009/0162060 A1 Jun. 25, 2009

(51) Int. Cl.
*H04J 14/02* (2006.01)

(52) U.S. Cl. ............... 398/25; 398/13; 398/16; 398/20; 398/28; 398/33; 398/34

(58) Field of Classification Search .................... 398/13, 398/16, 20, 25, 28, 33–34
See application file for complete search history.

(56) References Cited

U.S. PATENT DOCUMENTS

| | | | | |
|---|---|---|---|---|
| 6,073,248 A * | 6/2000 | Doshi et al. | ............ | 714/4 |
| 6,175,870 B1 * | 1/2001 | Gawlick et al. | ............ | 709/227 |
| 6,549,513 B1 * | 4/2003 | Chao et al. | ............ | 370/227 |
| 6,904,017 B1 * | 6/2005 | Meempat et al. | ............ | 370/238 |
| 7,454,138 B2 * | 11/2008 | Nozu | ............ | 398/25 |
| 7,983,558 B1 * | 7/2011 | Gerstel et al. | ............ | 398/25 |
| 2001/0017723 A1 * | 8/2001 | Chang et al. | ............ | 359/128 |
| 2002/0003639 A1 * | 1/2002 | Arecco et al. | ............ | 359/119 |
| 2004/0120705 A1 * | 6/2004 | Friskney et al. | ............ | 398/5 |
| 2004/0218525 A1 * | 11/2004 | Elie-Dit-Cosaque et al. | | 370/223 |
| 2006/0045100 A1 * | 3/2006 | Klausberger et al. | ............ | 370/400 |
| 2006/0165411 A1 * | 7/2006 | Schluter | ............ | 398/33 |
| 2006/0188252 A1 * | 8/2006 | Schluter | ............ | 398/25 |

OTHER PUBLICATIONS unusable. (2007). In The American Heritage® Dictionary of the English Language. Retrieved from http://www.credoreference.com/entry/hmdictenglang/unusable.*

* cited by examiner

*Primary Examiner* — Nathan Curs
*Assistant Examiner* — Tanya Ngo
(74) *Attorney, Agent, or Firm* — P. Su

(57) ABSTRACT

Methods and apparatus for efficiently utilizing an optical control plane distinct from an electronic control plane to facilitate the setup of paths in a dense wave division multiplexing network are disclosed. According to one aspect of the present invention, a method includes receiving a probe arranged determine the optical feasibility of a first path, and determining a probability of success associated with the probe. The probability of success indicates a likelihood that the probe will be successfully routed on the first path to the destination, and is associated with a particular wavelength. A second path on which to route the probe is dynamically identified if the probability indicates a low likelihood of successful routing on the first path. Finally, the method includes determining if a notification associated with the probe has been received, and altering the probability of success based on the notification if the notification has been received.

17 Claims, 10 Drawing Sheets

OPTIMIZATION MECHANISM FOR USE WITH AN OPTICAL CONTROL PLANE IN A DWDM NETWORK

BACKGROUND OF THE INVENTION

The present invention relates generally to techniques of determining a path in dense wavelength division multiplexing (DWDM) networks.

DWDM networks are optical networks in which optical signals at different wavelengths share an optical fiber. Each wavelength defines a particular communication channel. In a stricter sense, DWDM also refers to an International Telecommunications Union (ITU) standard which includes the specification of the particular channel wavelengths and the spacings between these channels and is based upon wavelength division multiplexing (WDM), an earlier ITU standard in which the channel spacings were further apart and a smaller number of wavelength channels were carried by an optical fiber. It should be noted that the term DWDM, as used herein, generally refers to the first, more inclusive sense so as to include the ITU WDM and DWDM standards, unless specifically stated otherwise.

For communication to be established between the source of the communication and its destination in an electronic network that includes network nodes, a path must be selected through the network nodes. The network path is determined by the electronic control plane of the network that is formed from control units located at each node within the network. At each selected network node, there is a control unit which, linked to other control units at other nodes of the network, selects the path of a communication from the selected network node. The aggregate of the control units forms the control plane of the network which, after determining the path, sets up the path of a communication from its source to its destination through the network nodes. Common technologies for determining a communications path are, for example, Internet Protocol (IP), Frame Relay, Asynchronous Transfer Mode (ATM), and Ethernet. Additionally, other technologies which may be associated with path determination MultiProtocol Label Switching (MPLS), which fits over such older technologies as mentioned above, and generalized MPLS (GMPLS), which is a version of MPLS. An emerging standard for path determination is Path Computation Engine (PCE), a technology by which a server computes a path through the network.

Such electronic control plane technologies are adapted for electronic networks. Unlike electronic networks, however, within a DWDM network, both a physical path of a communication and its wavelength must be determined. Furthermore, the nature of the optical signals substantially requires that optical parameters, as for example, the attenuation, chromatic dispersion between the nodes and the like, be considered in the proper selection of an optical path to ensure that signals reach their intended destination in proper condition. Otherwise, the optical signals must be regenerated at one or more intermediate nodes between a source and its intended destination.

BRIEF DESCRIPTION OF THE DRAWINGS

The invention will be readily understood by the following detailed description in conjunction with the accompanying drawings, in which.

DETAILED DESCRIPTION OF THE EXAMPLE EMBODIMENTS

General Overview

In one embodiment, a method includes receiving a probe on a node, calculating an optical budget for the probe, and determining whether the total optical budget is below a limit for the probe to reach the neighbors of the node. The optical budget includes a cumulative parameter budget and a recoverable parameter budget. The method includes discarding the probe if the total optical budget is below the limit, and determining if the cumulative parameter budget is below an adaptive or dynamically adjustable threshold when the total optical budget is below the limit. Finally, the method includes discarding the probe if the cumulative parameter budget is below the appropriate adaptive or dynamically adjustable threshold.

In another embodiment, a method includes receiving a probe that is arranged to determine the optical feasibility of a first path, and determining a probability of success associated with the probe. The probability of success indicates a likelihood that the probe will be successfully routed on the first path to the destination, and is associated with a particular wavelength. A second path on which to route the probe is dynamically identified if the probability indicates a low likelihood that the probe will be successfully routed on the first path. Finally, the method includes determining if a reservation notification or an error notification associated with the probe has been received, and altering the probability of success based on the reservation notification or the error notification if the reservation notification or the error notification has been received.

DESCRIPTION

An optical control plane (OCP) which is distinct from an electronic control plane is arranged to determine the optical feasibility of a routed path. The distinct OCP may be installed, upgraded, and/or deployed over the electronic control plane substantially without interrupting existing networks. Such a "modularization" approach has the benefits of relatively easy, efficient implementation and standardization. The OCP receives information of the optical elements in the network so that the optical feasibility of a path from its source node to its destination node may be readily determined from the optical parameters of the signal along the path. If the optical feasibility is determined to be negative, the indication is that the optical impairments of the path exceed predetermined thresholds. As a result, the OCP generates an error message and requests the electronic control plane to find a new route. This effectively ensures that the paths routed through the network are optically feasible.

Figure 1A:
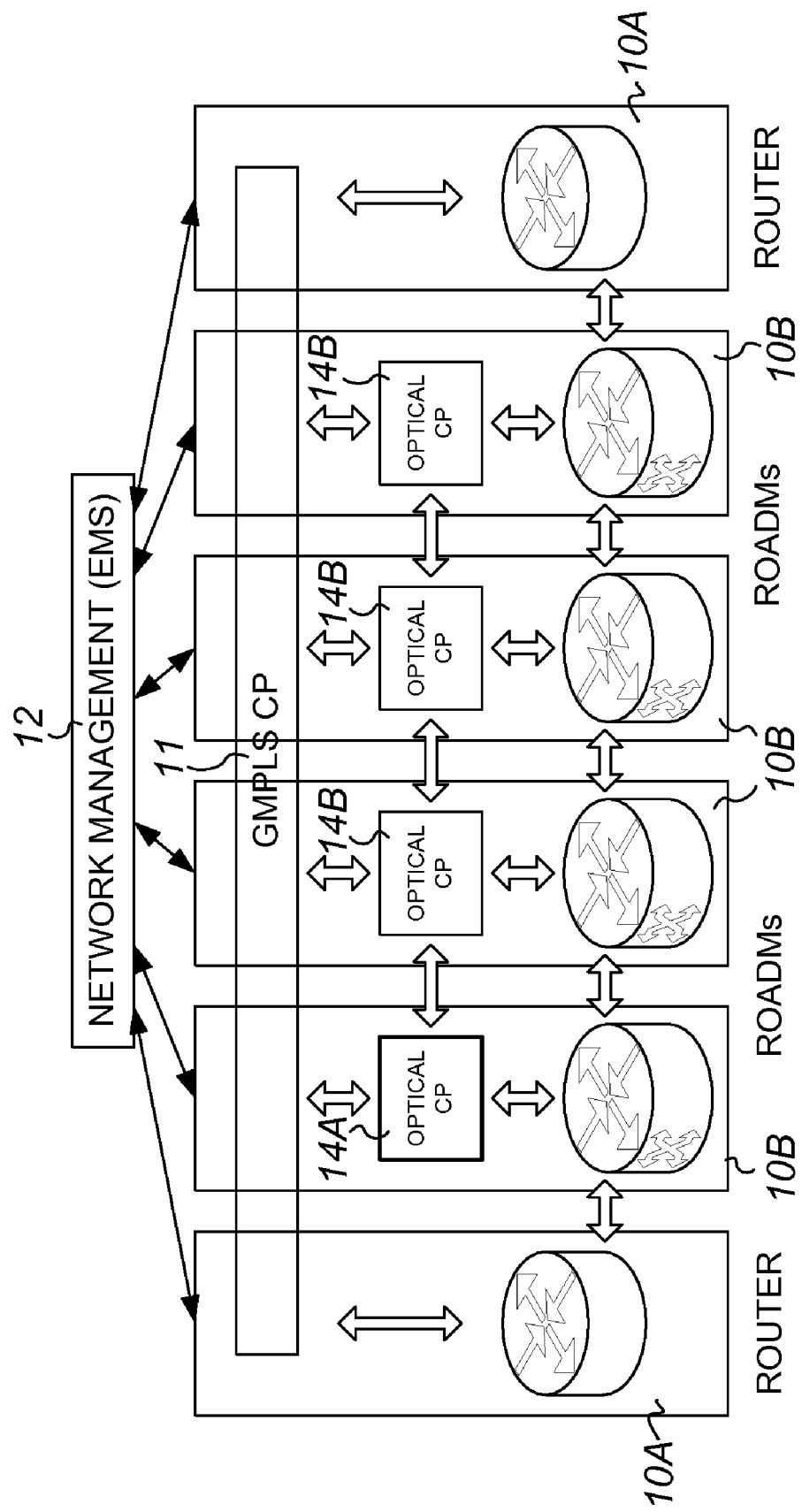
FIG. 1A is a block diagram representation of an optical network in which an optical control plane (OCP) is embedded into the nodes of the optical network and one of the OCP nodes checks the optical feasibility of a path route in accordance with an embodiment of the present invention.

FIG. 1A is a block diagram representation of an optical network in which an OCP is distributed across and embedded into the nodes of the optical network and one of the OCP nodes checks the optical feasibility of a path route in accordance with an embodiment of the present invention. An optical network, e.g., a Wavelength Division Multiplexing (WDM) network, includes nodes 10. Nodes 10 may generally include router nodes 10A and add/drop nodes 10B. Add/drop nodes 10B may be, in one embodiment, Optical Add/Drop Multiplexers (OADMs) such as Reconfigurable Optical Add/Drop Multiplexers (ROADMs). Typically, OADMs imply that optical signals of one or more fixed wavelengths are dropped and/or added a nodes 10B, and ROADMs imply that the added and/or dropped wavelengths at a node 10B may be changed or reconfigured. Although ROADMs are described and shown in FIG. 1A, it should be appreciated that ROADMs are shown for purposes of generality and should not be considered to be a limitation.

In an optical network, routers associated with nodes 10A are arranged to substantially handle the main switching functions of the optical network. Add/drop nodes 10B provide entry (add) and exit (drop) points to the optical network. Hence, the source and the destination nodes of a message in the network are generally add/drop nodes 10B. While only four of add/drop nodes 10B are shown, the number of add/drop nodes 10B in the network may generally vary widely. Arrows show that router nodes 10A are substantially connected to add/drop nodes 10B, as well as other router nodes 10A.

The network connections between nodes 10A and 10B may be relatively complex, and an electronic network control plane 11, e.g., an electronic network control plane operating under Generalized MultiProtocol Label Switching (GMPLS) handles the routing of a message between some source and destination nodes 10B. Over electronic network control plane 11 is a network management system 12 which handles the higher supervisory and control functions of the network, as will be understood by those skilled in the art.

An OCP 14, which includes OCP parts 14A and 14B, is physically distributed across nodes 10B of the optical network. OCP 14 gathers optical parametric information on the elements of the network, i.e., that OCP obtains information on the network elements such as add/drop nodes 10B which affect optical signals passing through the network. The term, "gathers," is generally used to include actions in which OCP 14 is passive and receives network element optical information sent to OCP 14.

An OCP part 14A of OCP 14 receives the path route information from electronic control plane 11, and determines the optical feasibility of the path route using the path route information. OCP 14 also checks channel feasibility. Other OCP parts 14B do not receive path route information from electronic control plane 11.

OCP part 14A is selected according to the path route from electronic control plane 11 to be either near the source node or the destination node. It should be noted that OCP 14 is located at add/drop nodes 10B of the optical network. In contrast to nodes 10B, the routers at nodes 10A regenerate, reshape and retime optical signals so that the functions of the OCP 14 are effectively not required at these switching nodes.

Figure 1B:
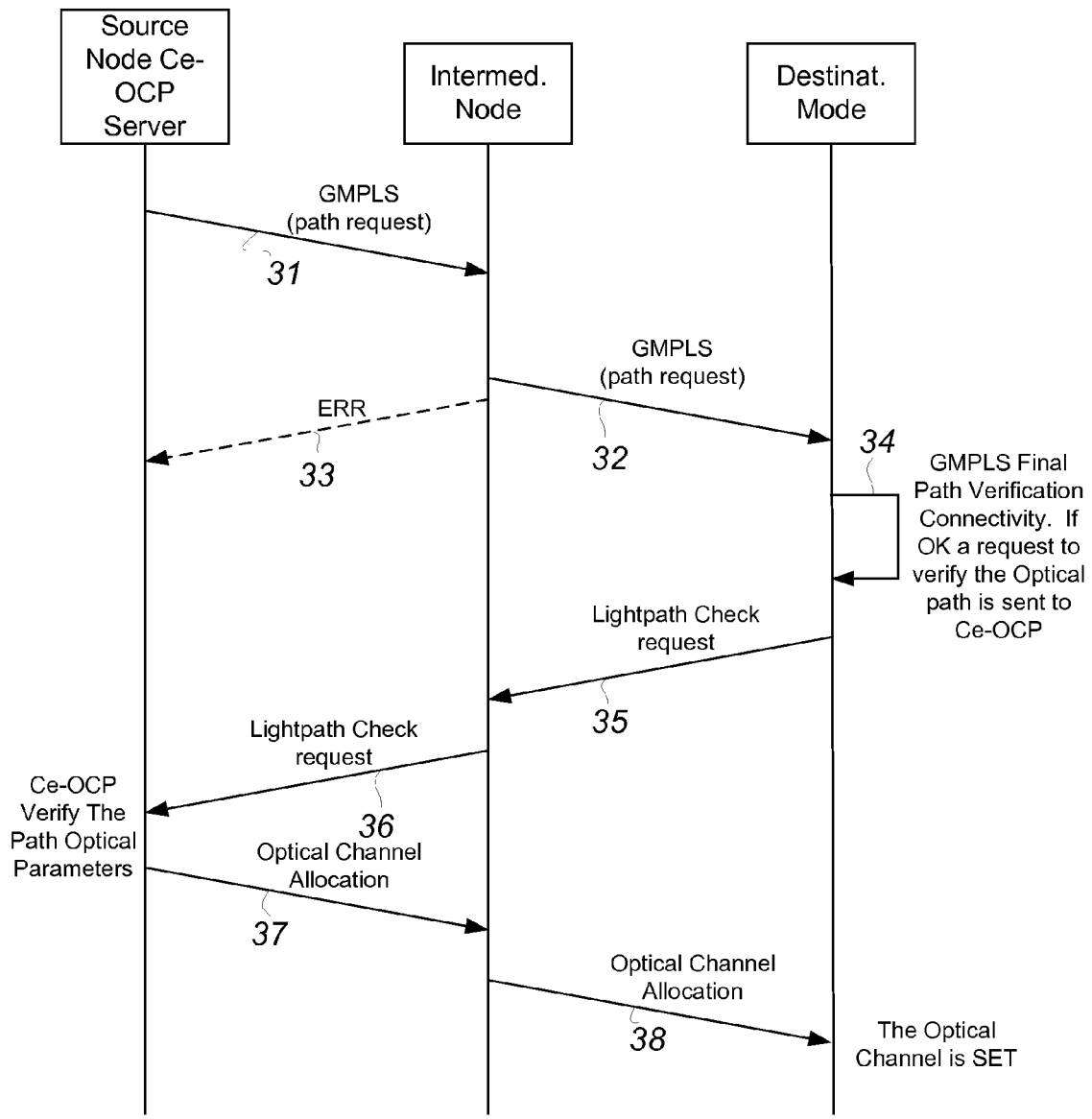
FIG. 1B is a diagrammatic representation of an operation of network nodes, e.g., nodes of the network of FIG. 1A, in accordance with an embodiment of the present invention.

With reference to FIG. 1B, the operation of the optical network of FIG. 1A will be described in accordance with an embodiment of the present invention. A source node includes or otherwise holds OCP part 14A, as described above, and sends a GMPLS path request message 31 to a destination node through at least one intermediate node. The intermediate node sends either a GMPLS error message 33 to the destination node, or relays path request 32 to the destination node, as appropriate. The destination node, upon verification of the GMPLS path connectivity 34, sends a request 35 back toward the source node to verify the lightpath between the source node and the destination node. The intermediate node relays the lightpath verification request 36 to the source node which determines the optical feasibility of the path route. If the path route is determined to be feasible, the source node sends a optical channel allocation message 37 and 38 to the destination node, thereby effectively setting an optical channel.

In general, lightpath verification includes determining if a possible route is found, and determining if an optical channel is feasible for that possible route. Typically, a determination of whether the optical channel is feasible includes a determination of whether the optical channel is optically feasible. An optical channel may not be optically feasible if connectivity is present, but an optical signal is unable to reach a desired destination, or an optical budget is not satisfied. If the optical channel is feasible for that possible route, the optical channel may be allocated. Alternatively, if the optical channel is not feasible for a possible route, another possible route may be processed, i.e., to determine if an optical channel is feasible for that new possible route or path.

Figure 2A:
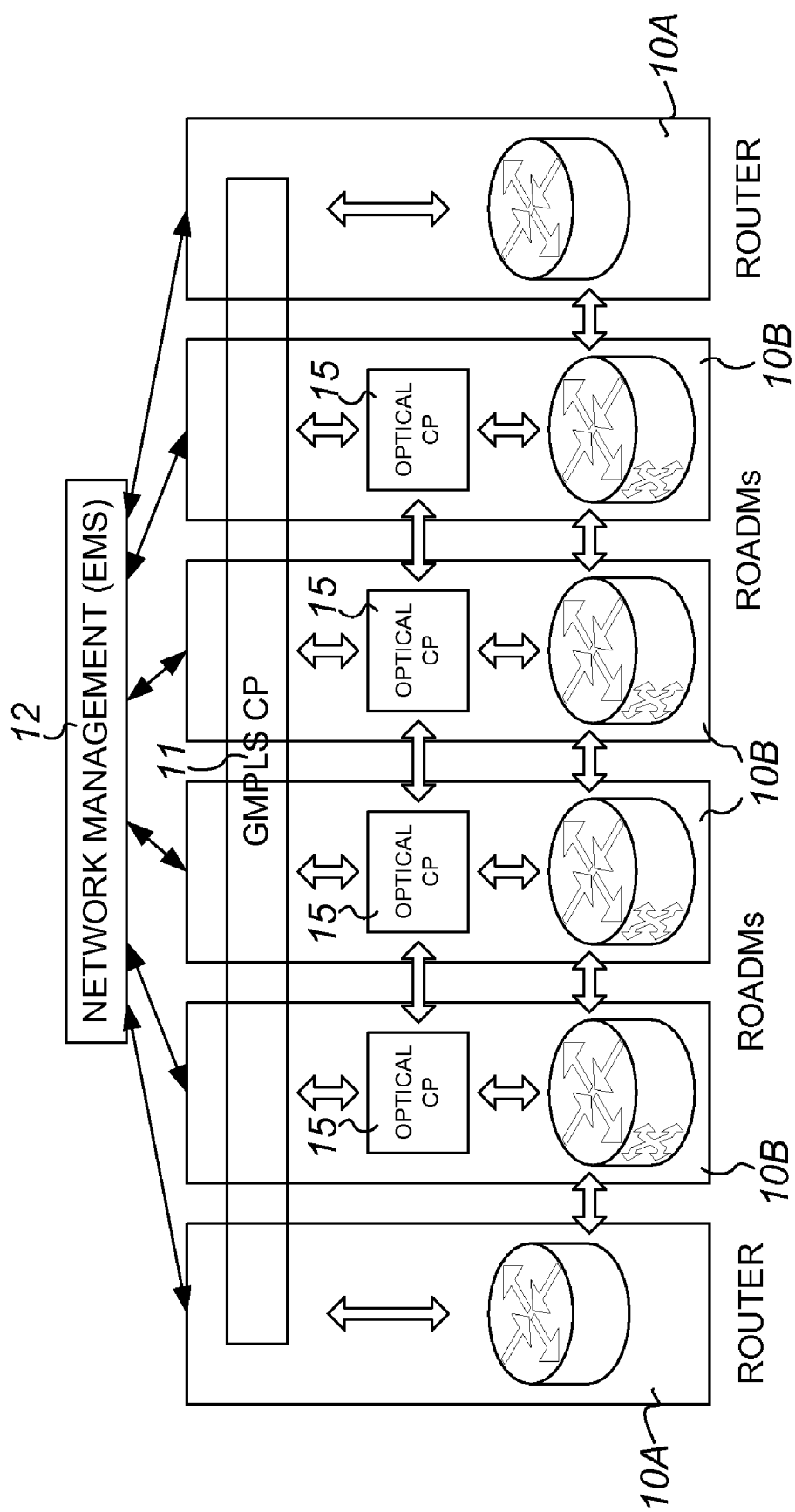
FIG. 2A is a block diagram representation of an optical network in which an optical control plane is embedded into the nodes of the optical network and substantially all of the nodes operate to effectively check the optical feasibility of a path route in accordance with an embodiment of the present invention.

OCP 14 of FIG. 1A, as described above, includes an OCP part 14A which is arranged to effectively check the optical feasibility of a path route. Alternatively, substantially all OCP parts included in an OCP may be arranged to effectively check the optical feasibility of a path route. FIG. 2A is a block diagram representation of an optical network in which an optical control plane is embedded into the nodes of the optical network and substantially all of the nodes operate to effectively check the optical feasibility of a path route in accordance with an embodiment of the present invention. An OCP 15 is distributed in OCP parts 15 across the nodes 10B of the network. In the described embodiment, each OCP part 15 gathers optical parametric information on a relatively limited basis, and the overall distributed OCP 15 participates in the determination of the optical feasibility of the optical path between source and destination nodes 10B.

Each OCP part 15 gathers optical parametric information about the optical elements of the node 10B in which each OCP part 15 is substantially embedded, and uses this information to determine the optical feasibility of a path. The amount of information gathered at each node 10B is relatively little, and may be obtained from information of the manufacturer of the elements of an overall network, or from previous behavior of the elements.

For a path routed by an electronic control plane 11, nodes 10B along the path through a particular embedded OCP part 15 sequentially receives a probe message from a previous node 10B along the path to determine the optical feasibility of the path up to the current node 10B. If OCP part 15 at a given node 10B determines optical feasibility is negative or otherwise not likely, OCP part 15 instructs electronic control plane 11 to re-route the path, and the process is restarted from the source node. This allows for a relatively quick elimination of unfeasible path routes. Otherwise, the probe message continues until the destination node is reached and the path route is confirmed.

The probe message may contain an explicit route, or multiple probe messages may be flooded through the network in multiple directions by the source and/or by the intermediate nodes to determine path routes concurrently. To avoid synchronicity in the sending of multiple probes by different source nodes, the transmission of the probes is timed by dynamic jitter which may relatively easily be configured as a parameter of a network protocol. For multiple probe messages, the intermediate nodes manage concurrently received probes. For example, if two probes reach an intermediate node, the first received probe message locks or otherwise blocks the "optical" resources of the node from the second received probe, and the second probe fails because the missing or unavailable resources indicate a lack of optical feasibility. If the first probe fails, the resources in the intermediate node are unlocked, and a notification message informs the second probe, or its source node, that resources are now available for the second probe message to try again, e.g., parts 14 of the distributed OCP of FIG. 2A gather optical parametric information on the network to determine its optical feasibility through the intermediate node. This mechanism applies to N probes reaching the intermediate node.

Figure 2B:
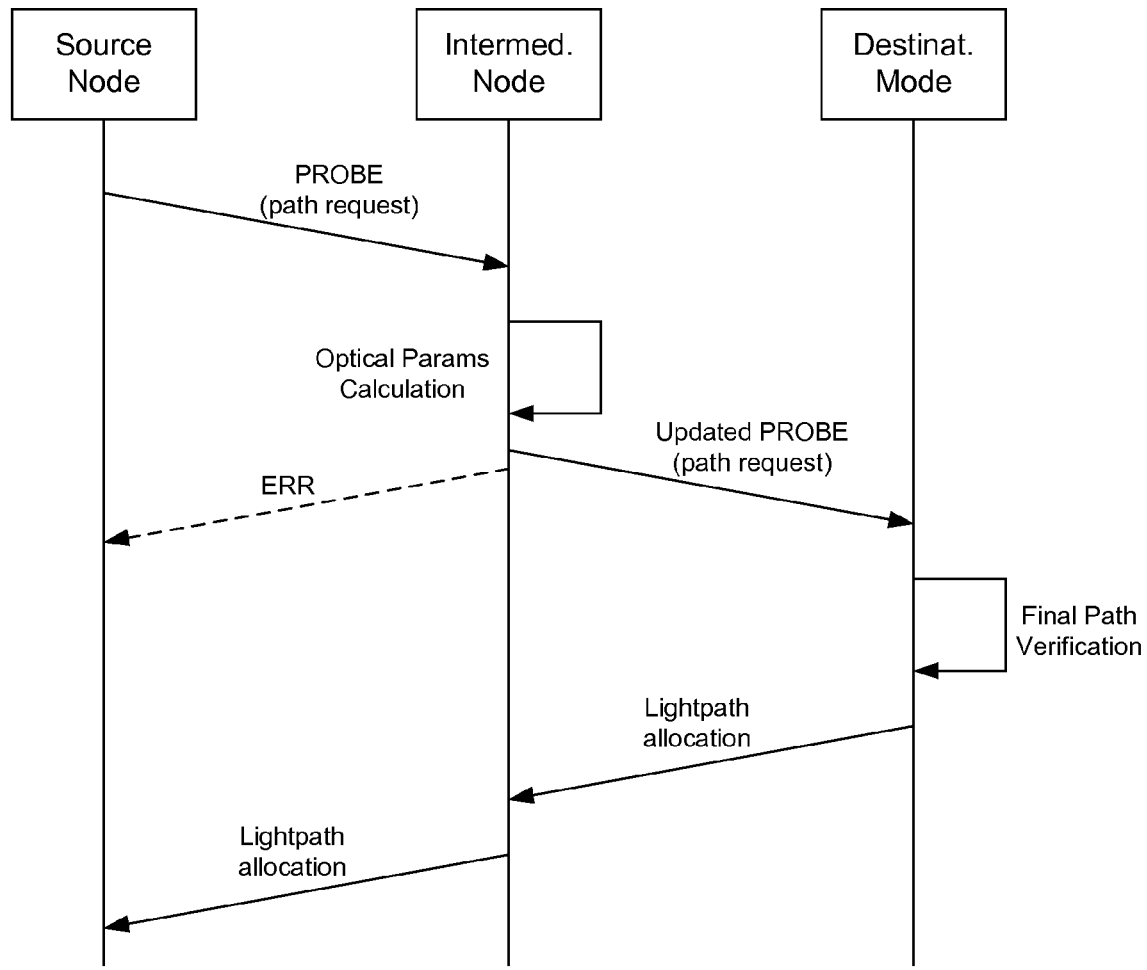
FIG. 2B is a diagrammatic representation of an operation of network nodes, e.g., nodes of the network of FIG. 2A, in accordance with an embodiment of the present invention.

FIG. 2B is a diagrammatic representation of an operation of network nodes, e.g., nodes of the network of FIG. 2A, in accordance with an embodiment of the present invention. It should be appreciated that any of the intermediate nodes, the source nodes, and the destination nodes associated with a communication may terminate one path route and initiate a re-routing process. This allows for early discards of unfruitful paths, and speeds up the determination of an acceptable path route.

As discussed above, a probe message tracks the optical impairments along a path route. Adding some "heuristics" within network nodes that perform path computations provides an "early discard" mechanism for probes. Such an early discard mechanism allows probes that have relatively little probability to succeed to be substantially discarded, while essentially leaving resources for better candidates, e.g., probes that are more likely to succeed. Effectively freeing resources for probes which have a higher probability of succeeding improves the probability of set up success, and also improves set up times associated with signaling.

An early discard, or heuristic probe discard, mechanism is generally configured to limit the traffic load on a given control channel, i.e., to control traffic, not precluding the capability to set-up the best lightpath. In one embodiment, each probe message has two kinds of optical parametric information, namely "cumulative" optical parametric information and "recoverable" optical parametric information. Cumulative parametric information refer to signal parameters, such as optical signal-to-noise ratio (OSNR), which may vary monotonically as the signal proceeds along the path route and generally is not recoverable upon reaching a certain limit. Recoverable parametric information refers to signal parameters, such as optical power, which may vary with an appropriate optical element, e.g., an optical amplifier, in a path router or a signal path.

Probe messages start with an allowed optical budget for each optical parameter for the path based on the source transmitter, and the budget is decreased by every node as it is passed. In other words, the optical budget of a probe is decreased at each node that the probe traverses on a path. The path taken by a probe message is considered to be unfruitful and is, therefore, discarded if the budgets for both cumulative and recoverable optical parametric information fall below an amount necessary for the signal at the node to reach all its neighbors, or if just the budget for the cumulative optical parametric information falls below a threshold T. The threshold T depends upon the remaining hops and/or the optical distance from the present node to the destination node and is, of course, greater than the threshold to reach the next hop in the path and should be at least as required by the hops remaining to reach the destination node. The threshold T may be calculated from historical data, e.g., adaptively.

Figure 3:
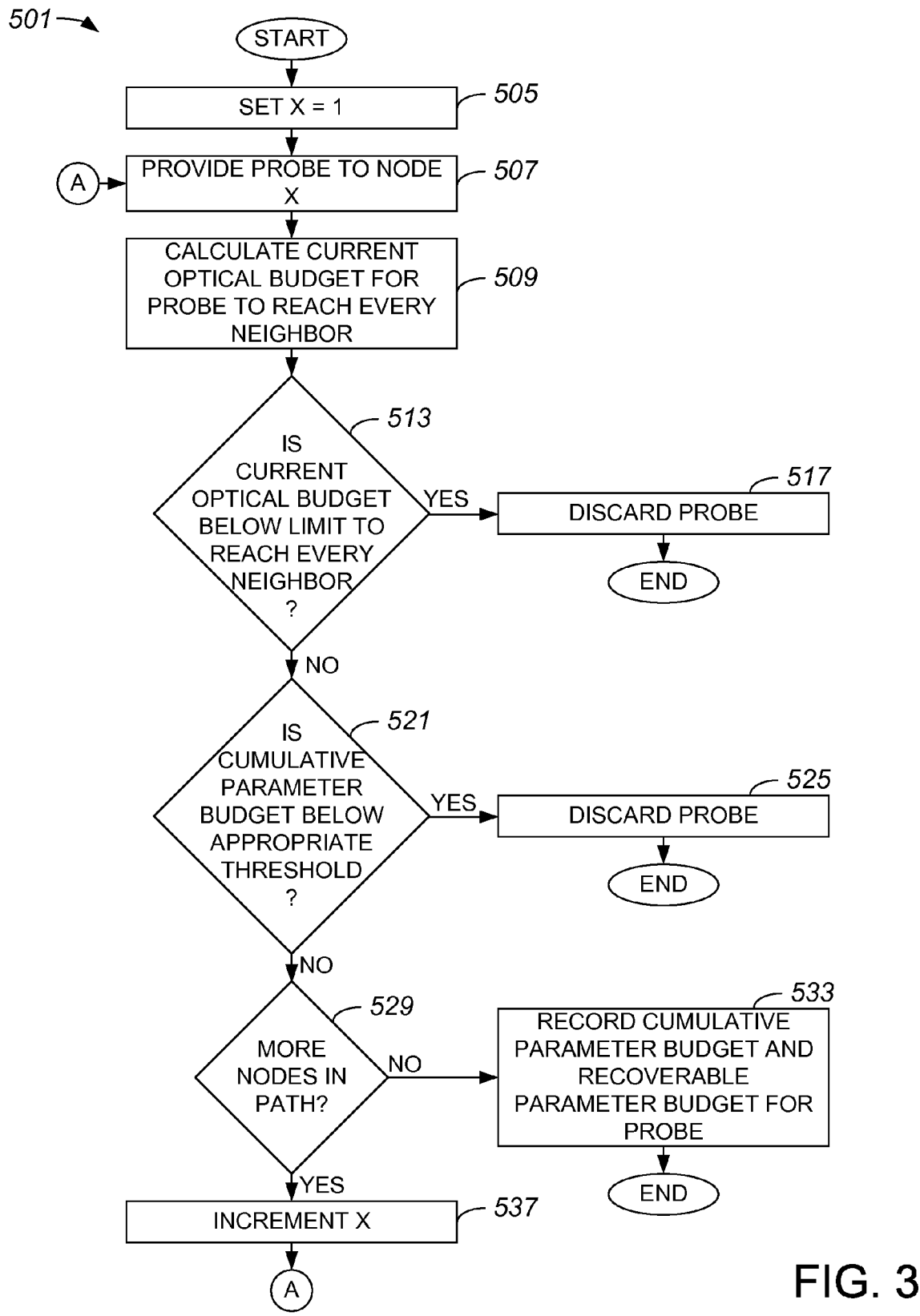
FIG. 3 is a process flow diagram which illustrates one method of implementing a heuristic probe discard in accordance with an embodiment of the present invention.

With reference to FIG. 3, a method of implementing an early discard mechanism, or a heuristic probe discard mechanism, will be described in accordance with an embodiment of the present invention. A process 501 of implementing a heuristic probe discard begins at step 505 in which a counter "X" is set to a value of one. In step 507, a probe is provided to node "X". Once the probe is provided to node "X," a current optical budget that is needed for the probe to reach every neighbor of node "X" is calculated in step 509, e.g., by node "X". It should be appreciated that neighbors of node "X" are generally one hop far, but may be associated with different optical "distances". The current optical budget may generally include a cumulative parameter budget and a recoverable parameter budget. In one embodiment, the calculation of the optical budget may be calculated prior to the implementation of a heuristic probe discard and, hence, the total optical budget may be provided as input data.

After the current optical budget that is needed for the probe to reach every neighbor of node "X" is calculated, it is determined in step 513 whether the current optical budget is below the limit to reach every neighbor. In one embodiment, the limit is a threshold parameter associated with the budget to reach every neighbor. If it is determined in step 513 that the current optical budget calculated in step 509 is below the limit to reach every neighbor, then the indication is that the probe is unlikely to succeed. As such, the probe is discarded in step 517, and the process of implementing a heuristic probe discard is completed.

Alternatively, if it is determined in step 513 that the current optical budget is not below the limit to reach every neighbor, then a determination is made in step 521 as to whether a cumulative parameter budget is below an appropriate threshold. The appropriate threshold may be determined using historical data to ascertain an amount of cumulative parameter budget that is generally needed for neighbors of node "X" to be reached. In one embodiment, the appropriate threshold may be adaptive such that the threshold varies with time, and each neighbor of node "X" may have its own appropriate threshold. It should be appreciated that the neighbors of node "X" may include both those neighbors that are one hop away, as well as those neighbors that are further away. One method of determining a threshold for a cumulative parameter budget will be described below with reference to FIG. 4.

If the determination in step 521 is that the cumulative parameter budget is below the appropriate threshold, the implication is that the probe has a relatively low probability of being successful. Accordingly, the probe is discarded in step 525, and the process of implementing a heuristic probe discard is completed.

However, if the determination in step 521 is that the cumulative parameter budget is not below the appropriate threshold, the probe is relatively likely to succeed. From step 521, process flow moves to step 529 in which it is determined if there are more nodes in a path. In other words, it is determined whether the probe is to traverse more nodes before reaching an intended destination. If it is determined that there are more nodes in the path, "X" is incremented in step 537, and process flow returns to step 507 in which the prove is provided to node "X".

On the other hand, if it is determined in step 529 that there are no more nodes in the path, the probe has effectively reached an intended destination. It should be understood that a heuristic probe discard is generally not needed at a destination node. Hence, in step 533, both the cumulative parameter budget and the recoverable parameter budget for the probe are recorded, and the process of implementing a heuristic probe discard is completed.

Figure 4:
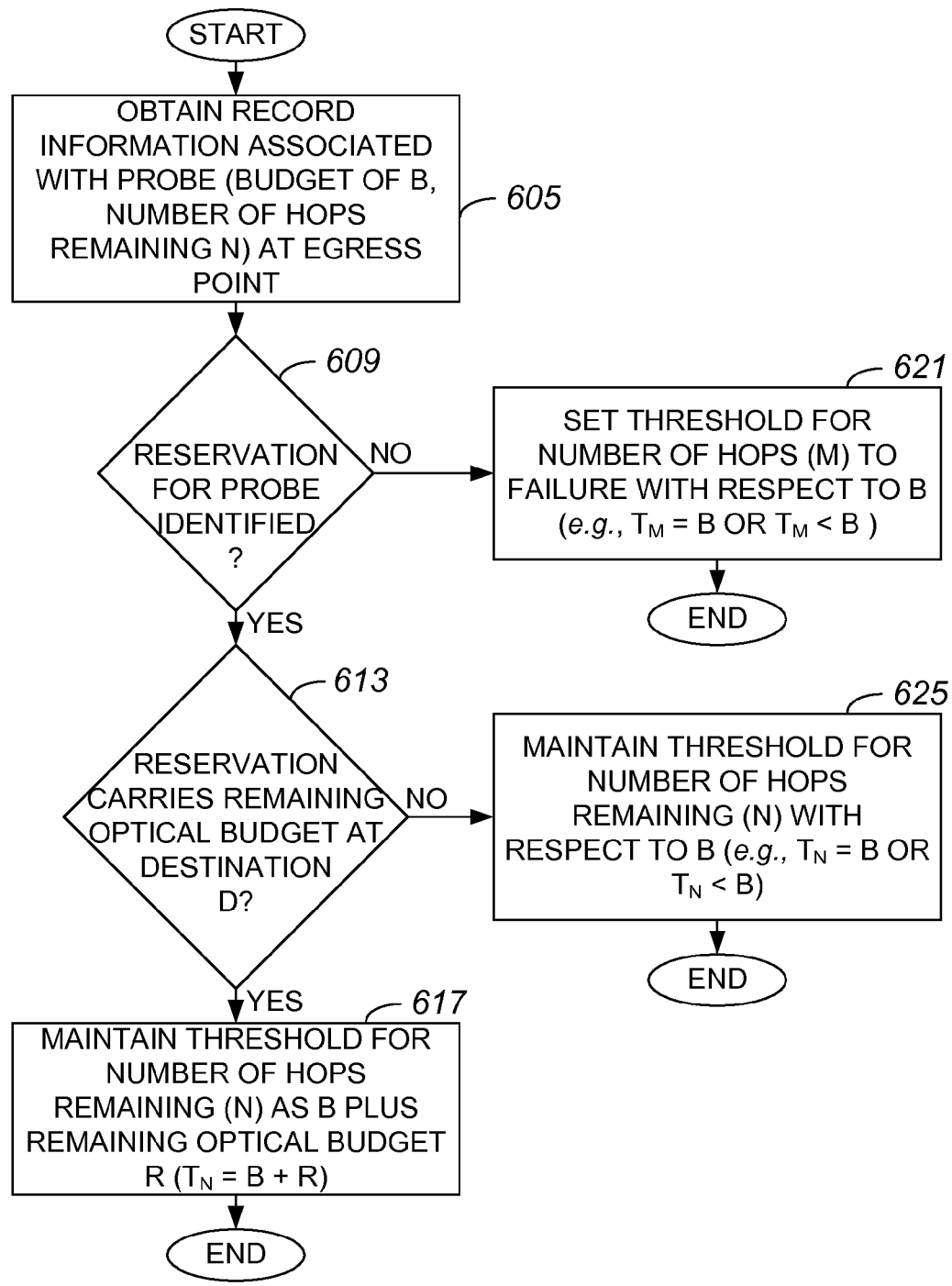
FIG. 4 is a process flow diagram which illustrates a method of determining a threshold for a cumulative parameter budget in accordance with an embodiment of the present invention.

FIG. 4 is a process flow diagram which illustrates a method of determining a threshold for a cumulative parameter budget in accordance with an embodiment of the present invention. A process 601 of determining a threshold for a cumulative parameter budget begins at step 605 in which record information associated with a probe is obtained at an egress point, e.g., an egress or output port of an optical node. The record information, which may be stored in data store arrangements of optical nodes, generally include a total optical budget "B" and a number of hops "N" remaining in a path. That is, a probe with N hops remaining has a budget of B.

Once the record information is obtained, it is determined in step 609 whether a reservation for the probe is identified. In general, the probe with have a reservation if a lightpath setup was successful. If the determination is that a reservation for the probe is not identified, the threshold for a number of hops "M", or $T_M$, to a failure is set with respect to B in step 621. By way of example, the number of hops "M" may be set to equal B, or set to a value that is less than B. In other words, the number of hops "M" is set to a value that is less than or equal to B. After the number of hops "M" is set, the process of determining a threshold for a cumulative parameter budget is completed.

Alternatively, if a reservation for the probe is identified in step 609, it is determined in step 613 as to whether the reservation carries the remaining optical budget at a destination "D". The remaining optical budget may be the optical budget that is left at destination "D". If the reservation does not carry the remaining optical budget at destination "D", the threshold for the number of hops "N" remaining is effectively maintained with respect to B. e.g., $T_N$ is set to equal B or a value less than B, in step 625, and the process of determining a threshold for a cumulative parameter budget is completed.

If, however, the determination in step 613 is that the reservation carries the remaining optical budget at destination "D", then the threshold for the number of hops "N" remaining is maintained as B in addition to a remaining optical budget "R", e.g., $T_N$ is set to equal B plus R, in step 617. After $T_N$ is set to equal B plus R, the process of determining a threshold for a cumulative parameter budget is completed.

Each intermediate node in a path or route through which probes flow may obtain notifications regarding lightpath reservations and/or errors. The intermediate nodes may record information obtained when probes flow through, and use that information to effectively determine the probability of success of any subsequent probe on a path that includes the intermediate nodes. The probability of success of routing subsequent probes may be used to dynamically reroute probes to achieve a higher probability of success. In other words, knowledge regarding the probability of success of sending probe messages may be used to dynamically reroute probes onto different routes or paths in an effort to achieve a higher probability of success.

Figure 5A:
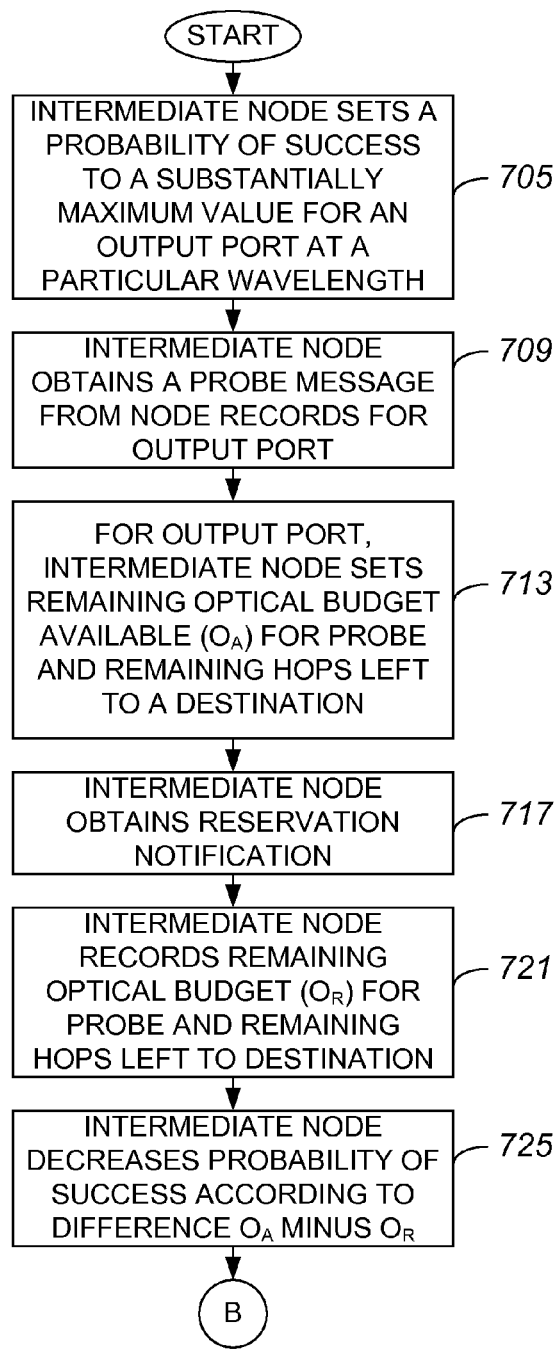
FIGS. 5A and 5B are a process flow diagram which illustrates a method of operating an intermediate node for dynamic probe rerouting in accordance with an embodiment of the present invention.
Figure 5B:
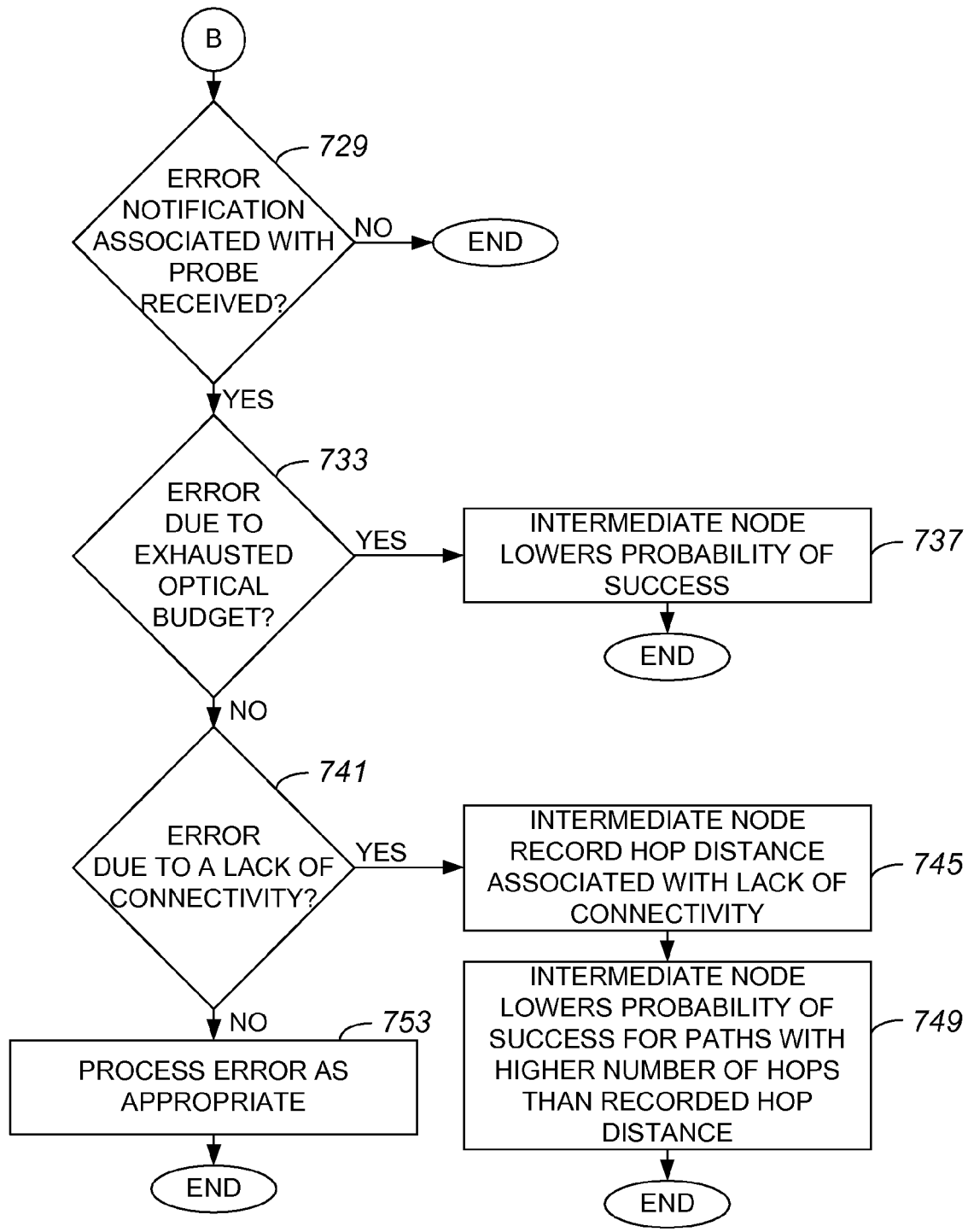

An intermediate node in a path that is traversed by a probe generally determines the probability of success associated with the probe. The probability of success may be altered at an intermediate node of a path as appropriate. FIGS. 5A and 5B are a process flow diagram which illustrates a method of operating an intermediate node for dynamic probe rerouting in accordance with an embodiment of the present invention. A process 701 of operating an intermediate node begins at step 705 in which the intermediate node sets a probability of success to a substantially maximum level for an output port at a particular wavelength. Once the probability of success is set, the intermediate node obtains a probe message from node records for the output port in step 709. In one embodiment, the probe message carries optical information that the intermediate network node may use to update its optical budget. The intermediate node then sets the remaining optical budget available $O_A$ for a probe and the hops remaining to a destination in step 713.

After the remaining optical budget available $O_A$ is set, the intermediate node obtains a reservation notification in step 717, as for example from a destination node. The reservation notification is arranged to carry a remaining optical budget associated with a destination node. Upon obtaining or otherwise receiving the reservation notification, the intermediate node records the remaining optical budget $O_R$ for the probe and the remaining hops left to the destination in step 721. The intermediate node then decreases the probability of success in step 725 associated with the probe according to the difference between $O_A$ and $O_R$.

From step 725, process flow proceeds to step 729 in which it is determined if an error notification associated with the probe is received. The error notification typically includes a reason for failure. If it is determined that no error notification is received, the process of operating an intermediate node is completed. Alternatively, if it is determined in step 729 that an error notification associated with the probe is received, it is determined in step 733 whether the error identified in the error notification was due to the optical budget being exhausted. If the optical budget is exhausted, the indication is that the cumulative optical budget is below an acceptable level, and no additional optical resources are available. In one embodiment, such an indication is that the optical signal to noise ratio (OSNR) is below an acceptable level, and no additional optical resources are available.

If it is determined in step 733 that the error was due to an exhausted optical budget, the intermediate node lowers the probability of success in step 737, and the process of operating an intermediate node is completed. On the other hand, if the error was not due to an exhausted optical budget, a determination is made in step 741 as to whether the error was due to a lack of connectivity. A lack of connectivity, e.g., wavelength connectivity, may occur if communication links between nodes in a path are disabled, or if any nodes in the path are inactive or otherwise off line. In one embodiment, a lack of connectivity indicates that a path message was blocked because no suitable wavelengths were available from a source to a destination.

When the error is determined not to be due to a lack of connectivity, the error is processed as appropriate in step 753. Processing the error may include identifying the source of the error, and taking steps to rectify the error. In addition, processing the error may also include notifying a system administrator of an error. Once the error is processed, the process of operating an intermediate node is completed.

Alternatively, if it is determined in step 741 that the error is due to a lack of connectivity, the intermediate node records a hop distance associated with a lack of connectivity in step 745. Then, in step 749, the intermediate node lowers the probability of success associated with paths which have a higher number of hops than the recorded hop distance. Once the probability of success is lowered, the process of operating an intermediate node is completed.

Figure 6:
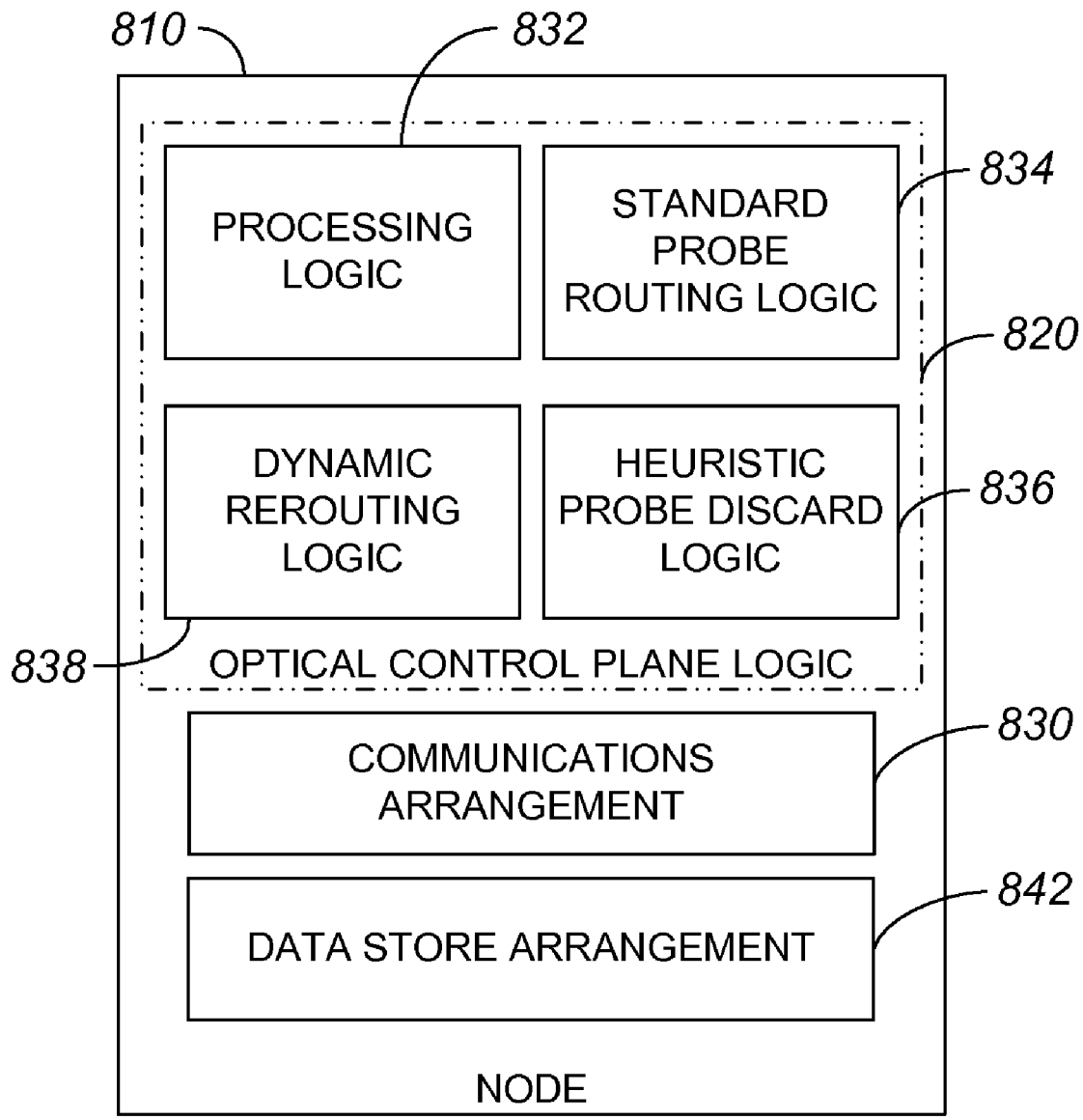
FIG. 6 is a block diagram representation of a node which includes optical control plane logic in accordance with an embodiment of the present invention.

FIG. 6 is a block diagram representation of a node which includes an OCP part in accordance with an embodiment of the present invention. A node 810, which may be an intermediate node, includes OCP logic 820, a communications arrangement 830, and a data store arrangement 842. OCP logic 820 generally includes hardware and/or software logic embodied in a tangible media. OCP logic 820 includes processing logic 832, standard probe routing logic 834, heuristic probe discard logic 836, and dynamic rerouting logic. Processing logic 832 is generally arranged to process signals sent and received by node 810. Standard probe routing logic 834 is arranged to route probes on appropriate paths between a source and a destination. Heuristic probe discard logic 836 is arranged to enable intermediate nodes in a path to discard probes that are unlikely to be successfully received by an intended destination. Dynamic rerouting logic is arranged to ascertain the likelihood that a particular probe will successfully reach a destination, and to reroute the particular probe in an effort to increase the likelihood that the particular probe will successfully reach a destination. In one embodiment, heuristic probe discard logic 836 is operable to execute the steps associated with FIG. 3, while dynamic rerouting logic is operable to execute the steps associated with FIGS. 5A and 5B.

Communications arrangement 830 is arranged to send and to receive probes at different wavelengths, and may include ingress and egress ports. Data store arrangement 842 is arranged to store information relating to node 810. By way of example, data store arrangement 842 may store probability information relating to probes sent through node 810 and optical budget information. Data store arrangement 842 may also store node records for an output port.

Figure 7:
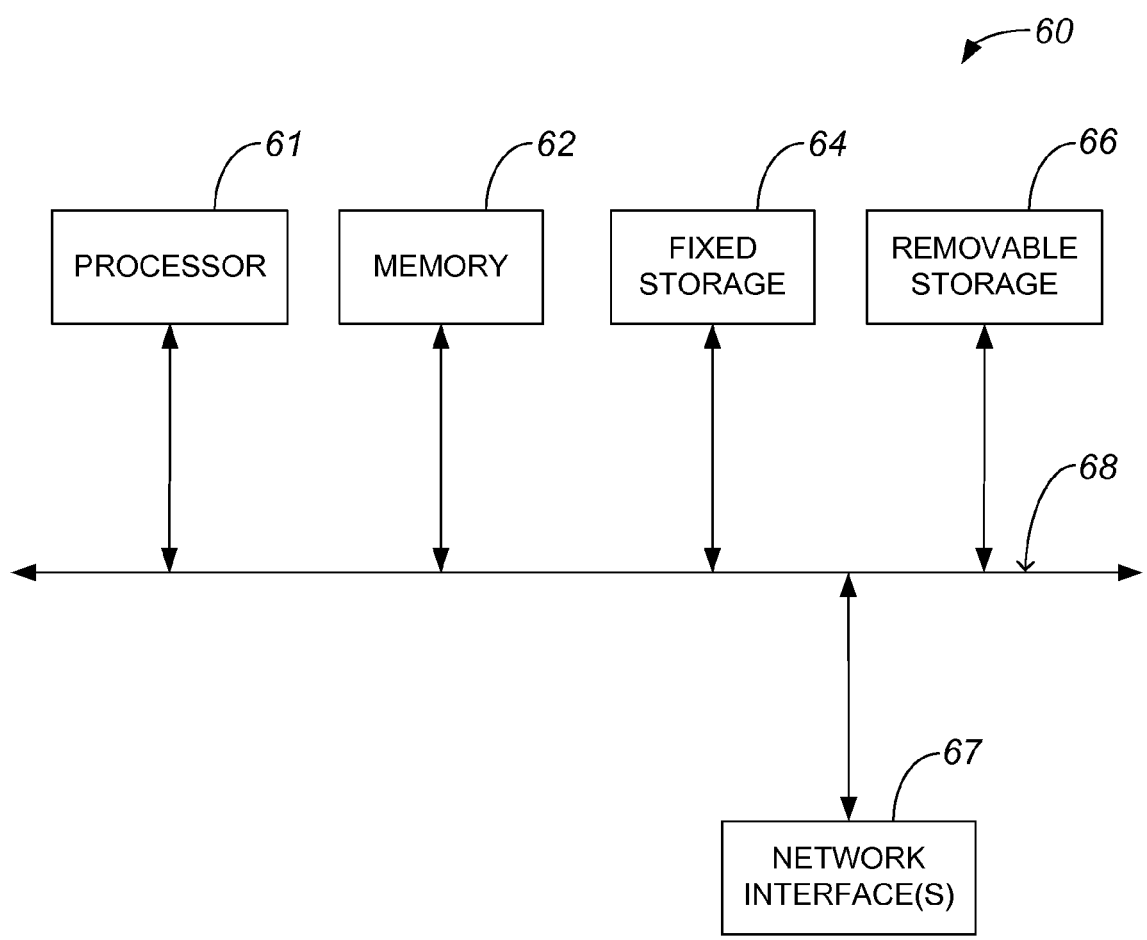
FIG. 7 is a diagrammatic representation an organization of a computing element which may act as an OCP server or OCP part embedded in a network node in accordance with an embodiment of the present invention.

FIG. 7 illustrates a block diagram of an example computing element that may be used for an OCP, part distributed over the nodes in FIGS. 1A and 2A in accordance with an embodiment of the present invention. A computing element 60 includes a memory subsystem 62 which may store and retrieve software programs incorporating computer software code or logic that implements aspects of the invention, data for use with the invention and the like, and a central processor subsystem 61 which, among other functions, processes the instructions and data of the computer code. The computer software code or logic may be stored on any suitable tangible media, as for example computer readable storage media associated with memory subsystem 62 such as semiconductor system memory preferably, CD-ROM, floppy disk, tape, flash memory, and hard drive. Element 60 further includes subsystems, such as fixed storage 64 (e.g., hard drive), removable storage 46 (e.g., CD-ROM drive), and one or more network interfaces 67, all connected by a system bus 68. Network interface 67, for example, might provide the pathway through which OCP data and instructions, such as path messages previously described, are sent and received. Additional or fewer subsystems may be used. For example, element 60 may include more than one processor 61 (i.e., a multi-processor system), or a cache memory.

Although only a few embodiments of the present invention have been described, it should be understood that the present invention may be embodied in many other specific forms without departing from the spirit or the scope of the present invention. By way of example, the steps associated with the methods of the present invention may vary widely. Steps may be added, removed, altered, combined, and reordered without departing from the spirit of the scope of the present invention. Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. In a DWDM network having a plurality of nodes and an electronic control plane, a method of operating an optical control plane distinct from said electronic control plane, the method comprising:
   receiving a probe on a node, the probe being arranged to determine an optical feasibility of a first path between a source and a destination, the node being included in the first path;
   determining a probability of success associated with the probe, the probability of success being arranged to indicate a likelihood that the probe will be successfully routed on the first path to the destination, the probability of success further being associated with a particular wavelength;
   dynamically identifying a second path on which to route the probe to the destination if the probability of success indicates a low likelihood that the probe will be successfully routed on the first path to the destination;
   determining if a reservation notification or an error notification associated with the probe has been received;
   obtaining information from the reservation notification when it is determined that the reservation notification has been received, wherein the information includes a first indication of a number of hops to the destination and a second indication of a remaining amount of optical budget for the probe; and
   altering the probability of success based on the reservation notification or the error notification if the reservation notification or the error notification has been received, wherein altering the probability of success based on the reservation notification when it is determined that the reservation notification has been received includes altering the probability of success based on a difference between an amount of overall optical budget and the remaining amount of the optical budget for the probe.

2. The method of claim 1 wherein if the error notification has been received, altering the probability of success includes determining if the error notification indicates an exhausted optical budget, wherein if the error notification indicates the exhausted optical budget, altering the probability of success includes lowering the probability of success.

3. The method of claim 1 wherein if the error notification has been received, altering the probability of success includes determining if the error notification indicates a lack of connectivity, wherein if the error notification indicates the lack of connectivity, altering the probability of success includes lowering the probability of success.

4. The method of claim 1 wherein the probe carries optical information associated with an optical budget.

5. The method of claim 1 wherein the reservation notification is arranged to carry the remaining optical budget associated with the destination.

6. The method of claim 1 wherein the node has at a plurality of neighbors between the node and the destination, and wherein determining the probability of success includes determining a likelihood that the probe will be successfully routed on the first path to each neighbor of the plurality of neighbors.

7. The method of claim 1 wherein the probability of success indicates the low likelihood when an optical budget associated with a portion of the first path between the node and the destination is less than a threshold.

8. An apparatus in a DWDM network, apparatus comprising:
- means for receiving a probe on a node, the probe being arranged to determine an optical feasibility of a first path between a source and a destination, the node being included in the first path;
- means for determining a probability of success associated with the probe, the probability of success being arranged to indicate a likelihood that the probe will be successfully routed on the first path to the destination, the probability of success further being associated with a particular wavelength;
- means for dynamically identifying a second path on which to route the probe to the destination if the probability of success indicates a low likelihood that the probe will be successfully routed on the first path to the destination;
- means for determining if a reservation notification or an error notification associated with the probe has been received;
- means for obtaining information from the reservation notification when it is determined that the reservation notification has been received, the information including a first indication of a number of hops to the destination and a second indication of a remaining amount of optical budget for the probe; and
- means for altering the probability of success based on the reservation notification or the error notification if the reservation notification or the error notification has been received, wherein the means for altering the probability of success based on the reservation notification include means for altering the probability of success based on a difference between an amount of overall optical budget and the remaining amount of the optical budget for the probe when it is determined that the reservation notification has been received.

9. The apparatus of claim 8 wherein if the error notification has been received, the means for altering the probability of success include means for determining if the error notification indicates an exhausted optical budget, wherein if the error notification indicates the exhausted optical budget, the means for altering the probability of success include means for lowering the probability of success.

10. The apparatus of claim 8 wherein if the error notification has been received, the means for altering the probability of success include means for determining if the error notification indicates a lack of connectivity, wherein if the error notification indicates the lack of connectivity, the means for altering the probability of success include means for lowering the probability of success.

11. The apparatus of claim 8 wherein the probe carries optical information associated with an optical budget.

12. The apparatus of claim 8 wherein the reservation notification is arranged to carry the remaining optical budget associated with the destination.

13. Logic encoded in one or more tangible media for execution and when executed operable to:
- receive a probe on a node, the probe being arranged to determine an optical feasibility of a first path between a source and a destination, the node being included in the first path;
- determine a probability of success associated with the probe, the probability of success being arranged to indicate a likelihood that the probe will be successfully routed on the first path to the destination, the probability of success further being associated with a particular wavelength;
- dynamically identify a second path on which to route the probe to the destination if the probability of success indicates a low likelihood that the probe will be successfully routed on the first path to the destination;
- determine if a reservation notification or an error notification associated with the probe has been received;
- obtain information from the reservation notification when it is determined that the reservation notification has been received, the information including a first indication of a number of hops to the destination and a second indication of a remaining amount of optical budget for the probe; and
- alter the probability of success based on the reservation notification or the error notification if the reservation notification or the error notification has been received, wherein the logic operable to alter the probability of success based on the reservation notification is further operable to alter the probability of success based on a difference between an amount of overall optical budget and the remaining amount of the optical budget for the probe when it is determined that the reservation notification has been received.

14. The logic of claim 13 wherein if the error notification has been received, the logic operable to alter the probability of success is further operable to determine if the error notification indicates an exhausted optical budget, wherein if the error notification indicates the exhausted optical budget, the logic operable to alter the probability of success is further operable to lower the probability of success.

15. The logic of claim 13 wherein if the error notification has been received, the logic operable to alter the probability of success is further operable to determine if the error notification indicates a lack of connectivity, wherein if the error notification indicates the lack of connectivity, the logic operable to alter the probability of success is further operable to lower the probability of success.

16. The logic of claim 13 wherein the probe carries optical information associated with an optical budget.

17. The logic of claim 13 wherein the reservation notification is arranged to carry the remaining optical budget associated with the destination.

* * * * *